US006172127B1

(12) United States Patent
Choi et al.

(10) Patent No.: US 6,172,127 B1
(45) Date of Patent: Jan. 9, 2001

(54) PREPARATION OF POLYIMIDE FOAM

(75) Inventors: Kil Yeong Choi; Jae Heung Lee; Sung Goo Lee; Mi Hie Yi, all of Daejeon; Seung Su Kim, Seoul, all of (KR)

(73) Assignee: Korea Research Institute of Chemical Technology (KR)

( * ) Notice: Under 35 U.S.C. 154(b), the term of this patent shall be extended for 0 days.

(21) Appl. No.: 09/151,735

(22) Filed: Sep. 11, 1998

(30) Foreign Application Priority Data

Sep. 12, 1997 (KR) .................................................. 97-47254

(51) Int. Cl.$^7$ ....................................................... C08J 9/02
(52) U.S. Cl. .............................. 521/77; 521/90; 521/117; 521/128; 521/185; 528/183; 528/209
(58) Field of Search ............................ 521/77, 117, 185, 521/90, 128; 528/183, 229

(56) References Cited

U.S. PATENT DOCUMENTS

| | | | |
|---|---|---|---|
| 4,241,114 | 12/1980 | Gagliani | 427/370 |
| 4,241,193 | 12/1980 | Gagliani | 521/77 |
| 4,273,886 | 6/1981 | Gagliani | 521/185 |
| 4,296,208 | 10/1981 | Gagliani et al. | 521/77 |
| 4,305,796 | 12/1981 | Gagliani et al. | 204/159.19 |
| 4,319,000 | 3/1982 | Gagliani et al. | 521/189 |
| 4,332,656 | 6/1982 | Gagliani et al. | 204/159.14 |
| 4,369,261 | 1/1983 | Gagliani et al. | 521/189 |
| 4,647,597 | 3/1987 | Shulman et al. | 521/185 |
| 4,656,198 | 4/1987 | Shulman et al. | 521/56 |
| 4,670,473 | 6/1987 | Walker et al. | 518/706 |
| 4,806,573 | 2/1989 | Lee | 521/157 |
| 4,824,874 | 4/1989 | Lee | 521/127 |
| 4,830,883 | 5/1989 | Lee | 427/244 |
| 4,952,611 | 8/1990 | Indyke | 521/185 |
| 4,978,692 | 12/1990 | Ezawa et al. | 521/185 |
| 5,234,966 | 8/1993 | Barringer et al. | 521/117 |

*Primary Examiner*—Morton Foelak
(74) *Attorney, Agent, or Firm*—Finnegan, Henderson, Farabow, Garrett & Dunner, L.L.P.

(57) ABSTRACT

The invention herein relates to a process of preparing a novel polyimide foam having superior heat-resistance, flame retardancy, homogeneous size and distribution of cells, and low density, wherein a polyimide precursor in a granular form is prepared by means of using heterocyclic amine as catalyst and then foaming.

According to the present invention, the preparing process of a polyimide foam comprises reacting aromatic carboxylic acid or the anhydrides thereof with an excess of aliphatic univalent alcohol to yield an aromatic ester solution. To the aromatic ester solution, divalent amines or the mixture thereof were added in the equivalent amount of said carboxylic acid or the anhydrides thereof in addition to a catalyst and surfactant to yield a polyimide. Then, the precursor in a granular form mixture was imidized while foaming by means of pre-heating and then heating in a microwave oven, after which was cured at a high temperature.

Consequently, the present invention has the effect of providing a preparing process for a polyimide foam with superior heat-resistance and heat-insulating property, which can be widely used as substrate in aerospace, submarine, special ship, and high-speed train.

14 Claims, No Drawings

PREPARATION OF POLYIMIDE FOAM

BACKGROUND OF THE INVENTION

1. Field of the Invention

The invention herein relates to a process of preparing a novel polyimide foam having superior heat-resistance, flame retardant, homogeneous size and distribution of cells, and low density, wherein a polyimide precursor in a granular form is prepared by means of using heterocyclic amine as catalyst and then foaming.

2. Description of the Prior Art

In general, the polymer foam refers to a light substrate in which the cells within the polymer are well distributed with low density. The foam is widely used as basic material in adiabatic, cushion, shock absorbent, soundproof material, and packaging material due to its superior cushion, adiabatic, soundproof, vibration-proof properties. The general purpose cells such as polyurethane or polyolefin cells are widely used in automobile, ships, and transportation equipment due to their superior strength, restoring capacity, adiabatic property, preparatory and economic efficiency. However, for a use in aerospace, submarine, special ships and high-speed train, which require superior heat-resistance and flame retardant, a special heat-resistance foam with superior heat-resistance and flame retardancy properties is used therein. With an aromatic or heterocyclic structure, a typical heat-resistance foam includes polyimide with high heat-resistance. In particular, the polyimide foam is known to have a wide application due to its superior thermal stability and flame retardancy.

The preparing process of a polyimide-based foam includes carrying out a foaming by means of heating a polyimide in an oligomer condition in an oven or microwave oven (U.S. Pat. No. 4,241,114; 4,241,193; 4,273,886; 4,296,208; 4,305,796; 4,332,656). However, the problem of a difficulty in control of the physical property arose in which a chain extension reaction and foaming occur simultaneously. Further, in U.S. Pat. No. 4,319,000, 3,3',4,4'-benzophenonetetracarboxylic acid dianhydride (BTDA) and ethyl alcohol as esterifying agent were used to control the closed cell amount to the level below 95%. The polyimide foam was prepared by using two types of amines with a base dissociation constant of below $10^{-10}$, which were selected from the group consisting of 4,4-diaminodiphenylsulfone, 3,3'-diaminodiphenylsulfone, and 2,6-diaminopyridine. In order to obtain an polyimide foam with superior flexibility and homogeneous foaming structure, U.S. Pat. No. 4,369,261 used 3,3', 4,4'-benzophenonetetracarboxylic acid dianhydride, methylenedianiline (MDA), 2,6-diaminopyridine, and activated carbon or graphite with superior conductivity. In U.S. Pat. Nos. 4,647,597, 4,656,198 and 4,670,473, a polyimide foam was prepared by using 3,3', 4,4'-benzophenonetetracarboxylic acid dianhydride, methylenedianiline, and 2-methoxyethanol as plasticizer.

In U.S. Pat. Nos. 4,806,573, 4,824,874, and 4,830,883, 3,3', 4,4'-benzophenonetetracarboxylic acid dianhydride, organic polyisocyanurate, and furfuryl alcohol were used to prepare a polyimide precursor, which in turn was used as a reenforcing agent of a foam with an open foam structure.

In U.S. Pat. No. 4,952,611, a polyimide foam, with superior compression set property for a use in seat cushion, was prepared by using a mixture of 3,3', 4,4'-benzophenonetetracarboxylic acid dianhydride and 2-(vicynal-dicarboxycyclohexenyl)-succinic acid in addition to an amine selected from methylenedianiline or 2,6-diaminopyridine. diaminopyridine.

In order to obtain a cell size of 0.1 to 1.0 mm in a polyimide foam, in U.S. Pat. No. 4,978,692, an amine was selected form the group consisting of 3,3', 4,4'-benzophenonetetracarboxylic acid dianhydride, 4,4-bis[4-(3-aminophenoxy)phenyl]sulfide, and 4,4-bis[4-(3-aminophenoxy)phenyl]sulfone, 4,4-bis[4-(3-aminophenoxy)vinyl]benzophenon.

In U.S. Pat. No. 5,234,966, for preparing a polyimide foam of a target density, 3,3', 4,4'-benzophenonetetracarboxylic acid dianhydride, methylenedianiline, and 2,6-diaminopyridine was used, and a mixture of alcohol and water were used as esterifying agent.

SUMMARY OF THE INVENTION

In the present invention, an aromatic carboxylic acid or the anhydrides thereof, and an aromatic or heterocyclic amine were used to prepare a polyimide precursor. In such process, heterocyclic amine, which has not been known to be applicable herein, was used as catalyst in order to prepare a polyimide precursor. By means of using the aforementioned precursor, a novel polyimide foam which has low density, homogeneous cell size and distribution, superior restoring capacity and flame retardancy was prepared.

The objective of the invention lies in providing a preparing process of a polyimide foam with low density, homogeneous cell size and distribution, superior restoring capacity and flame retardancy by means of using a polyimide precursor which was prepared by using heterocyclic amine was catalyst.

In order to achieve the objective according to the present invention, the preparing method of a polyimide foam comprises reacting aromatic carboxylic acid or the anhydrides thereof with an excess of aliphatic univalent alcohol to yield an aromatic ester solution. To the aromatic ester solution, divalent amines or the mixture thereof were added in the equivalent amount of said carboxylic acid or the anhydrides thereof in addition to a catalyst and surfactant to yield a polyimide. Then, the precursor in a granular form mixture was imidized while foaming by means of pre-heating and then heating in a microwave oven, after which was cured at a high temperature.

DETAILED DESCRIPTION OF THE INVENTION

The polyimide foam according to the present invention is prepared as follows: The following compounds were added to yield a polyimide precursor in solution: 1 mole of aromatic carboxylic acid or the anhydrides thereof; 1 mole of divalent aromatic amine or the alicyclic divalent amine; 6 to 20 moles of aliphatic univalent alcohol with 1 or 6 carbon atoms as esterifying agent; 0.01 to 10 mole % of heterocyclic amine catalyst to said aromatic carboxyl acid or the anhydrides thereof; and 0.02 to 2 wgt % of surfactant to the total amount of said aromatic carboxylic acid or the anhydrides thereof and said divalent amine. Then, the powder in solid phase was prepared by removing alcohol which was used as esterifying agent at 50° C. in the rotary evaporator. The particle size of said powder was controlled to 300 μm or less by using a sieve. Thereafter, it was placed in an oven with reduced pressure at a temperature range of 40 to 60° C. to completely remove alcohol therefrom. The polyimide precursor showed the intrinsic viscosity of 0.1 dL/g to 0.2 dL/g measured at 30° C. by using dimethylacetamide as solvent.

After placing the completely dried polyimide precursor onto the Teflon sheet, it was pre-heated for 1 to 30 minutes at 120° C. to 180° C. in a convection oven. Thereafter, the polyimide agent was prepared with an imidization level of 10 to 50% by controlling the on/off time on the microwave oven with the frequency of 2,450 MHz. The polyimide foam so prepared, however, was easily breakable due to its condition of simple foaming. Consequently, the polyimide was cured in an oven with a heat fan at 200~300° C. for 0.5 to 4 hours, thereby resulting in 70% or more of opened cell structure. By using the above process, a polyimide foam was prepared having superior restoring capacity and flame retardancy with the average cell size of 50 $\mu$m to 2 mm, and the density of 3 to 25 kg/m$^3$.

According to the preparing process of a polyimide foam, if the amount of aliphatic alcohol, which is used as esterifying agent of aromatic carboxylic acid or the anhydrides thereof, is less than 6 mole or more than 20 mole, the esterification reaction of aromatic carboxylic acid or the anhydrides thereof is carried out at a unduly slow rate, and a complete esterification is not achieved. If the amount of catalyst during the prepare of the polyimide precursor is less than 0.01 mol % to the aromatic carboxylic acid or the anhydrides thereof, said amine may react with an aromatic carboxylic acid or the anhydrides thereof, which poses a problem of deficient expression of catalysis during the formation of a polyimide precursor. As such, the polyimide foam prepared with such polyimide precursor is unduly hard and easily breakable. On the other hand, if the amount of catalyst exceeds 10 mol %, the molecular weight of a polyimide precursor is to large so that it is impossible to obtain a polyimide foam.

The aforementioned surfactant imparts a significant influence on the size, distribution, stability, mechanical property of the polyimide foam. If the amount of surfactant is less than 0.02 wt % of the total amount of said aromatic carboxylic acid or the anhydrides thereof an divalent amine, the cell structure of homogeneous size and distribution cannot be obtained. If it exceeds 2 wt % of the same, the polyimide foam as final product has poor flame retardant.

If the average particle size of a polyimide precursor is more than 300 $\mu$m, the foam structure is too large to the point of poor mechanical property.

As for the viscosity of the foam, if the intrinsic viscosity of the precursor is less than 0.01 dL/g measured at 30° C. with dimethylacetateamide as solvent, the molecular weight at the time of prepare of the foam is too small to instigate a foam. In contrast, if the viscosity is more than 0.2 dL/g, no foaming occurs.

During a foaming process of the polyimide precursor granules in the microwave oven, if the pre-heating temperature is less than 120° C., the fluidity of the precursor is poor, which makes it impossible to obtain a homogeneous cell structure. If the temperature is more than 180° C., the portions of precursor granules melt, thereby causing problems of disabling the prepare of a foam with homogeneous foam structure, i.e., cavity in the foam. Further, if the pre-heating time is less than 1 minute, the precursor particles are not sufficiently heated so that no foaming occurs. If the pre-heating time is more than 30 minutes, the surface of the precursor is melted onto the Teflon board, thereby making it impossible to make a foam of high density. Although the microwave oven for foaming employed 2,450 MHz, the invention herein should not be limited in anyway thereby.

If the polyimide foam has the degree of imidization of less than 10%, the melting point during foaming is too low to the point that it is difficult to maintain foaming. If it is more than 50%, the melting point is too high which causes a difficulty in foam formation.

The aforementioned polyimide foam prepared by a microwave oven is easily breakable and requires curing. If the curing temperature is less than 200° C., the imidization does not proceed, and the polyimide foam remains fragile. If the curing temperature is more than 300° C., the surface melts and become oxidized, which causes deterioration of the restoring capacity of the foam. If the curing time is less than 0.5 hours, the imidization does not sufficiently occur. If it exceeds 4 hours, the surface melts and become oxidized, which causes deterioration of the restoring capacity of the foam.

If the opened foam structure of the polyimide foam is less than 70%, the foam becomes too hard. If the average size of the cell is less than 50 $\mu$m or the density thereof is greater than 25 kg/m$^3$, the rigidity becomes problematic. If the average size of the cell exceeds 2 mm or the density thereof is less than 3 kg/m$^3$, the restoring capacity is deteriorated.

As for the preparing of a polyimide foam according to the present invention, 3,3',4,4'-benzophenonetetracarboxylic acid as an aromatic carboxylic acid, which is one of the essential substituents, and 3,3',4,4'-benzophenonetetracarboxylic acid dianhydride as an anhydride thereof can be used.

As for the aliphatic alcohol with the number of carbon of 1 to 6, which is used for the esterification of the anhydride, it may include methyl alcohol, ethyl alcohol, n-propyl alcohol, iso-propyl alcohol, n-butyl alcohol, iso-butyl alcohol, n-pentyl alcohol, n-hexyl alcohol, etc.

Further, an aromatic divalent amine may include 3,3'-diamino-diphenylsulfone, 4,4'-diamino-diphenylsulfone, 3,3'-diamino-diphenylsulfide, 4,4'-diamino-diphenylsulfide, meta-phenylenediamine, p-phenylenediamine, and p,p'-methylenedianiline. For alicyclic divalent amine, isophoronediamine or bis-amino-methylcylohexane may be used.

On the other hand, as for the catalyst used during the prepare of the polyimide precursor, the heterocyclic amine include isoquinoline, quinoline, idmidazole, 1-methylimidazole, 2-methylimidazole, 4-methylimidazole, pyrrol, pyrazole, indole, pyridazine or pyrimidine.

As for the non-ionic surfactant containing fluoride, which may effect the size, distribution and stability of the cell, Zonyl FSN® (Du Pont of USA), FSN-100®, FSO® or FSO-100®, which are manufactured by Du Pont of USA may be used.

The following examples illustrate various aspects of the invention herein but are not to be construed to limit the claims in any manner whatsoever.

EXAMPLE 1

To a 250 ml reactor equipped with an agitator, temperature controller, nitrogen-inlet and condenser, nitrogen gas was slowly purged as 3,3',4,4'-benzophenontracarboxylic acid dianhydride (32.22 g, 0.1 mole) was added to 32 ml of methyl alcohol (0.8 mole). Thereafter, the mixture was heated while being refluxed, during which esterification reaction of 3,3',4,4'-benzophenontracarboxylic acid dianhydride was carried out. As the esterification of the solution within the reactor was carried out, the suspension therein became a clear solution. The solution after the esterification reaction was cooled to 50° C., and 19.83 g of methylenedianiline (0.1 mole) and 0.13 g of isoquinoline as catalyst (0.001 mole) were added. Thereafter, the mixture was heated once again for a reflux of methyl alcohol, and the reaction was carried out for 10 minutes, after which a polyimide precursor in solution was obtained. To the precursor in solution, 0.052 g of Zonyl FSO® (0.1 wt %) of Du Pont Inc.

(USA) was added as non-ionic surfactant, after which was stirred for 2 minutes. After the reaction methyl alcohol was removed from the solution by means of rotary evaporator at 50° C. to yield a polyimide precursor in solid phase. Then, a sieve was used to homogeneously make the particle size below 300 μm. In order to completely remove methyl alcohol from the precursor, it was placed in an oven under reduced pressure and re-dried for 3 hours at 60° C. The yielded precursor was dissolved in dimethylacetamide at 0.5 g/dL, and the inherent viscosity therefrom was determined to be 0.03 dL/g at 30° C. 10 g of completely dried polyimide precursor particles were place onto the Teflon board and were pre-heated in a dry oven at 140° C. for 10 minutes, after which was placed in a microwave oven with a frequency of 2,450 MHz. Then, the foaming was carried out for 10 minutes with the on/off control set at 60/30 seconds, after which a polyimide foam was obtained. The degree of the imidization of the polyimide foam was 25% as measured by the thermal gravimetric analyzer of Du Pont of USA. The yielded polyimide foam was cured in an oven at 260° C. in order to obtain a polyimide foam with homogeneous cell size and distribution, excellent heat-resistance, and flame retardant. When the polyimide foam was examined under electronic microscope, the cell size thereof was determined to be 0.5~1.2 mm. The density of the polyimide foam was 11 kg/m$^3$, measured by ASTM D 3574(A). As for the compression set test, the sample was compressed to 90% of its thickness, and the loss of sample therefrom was 21%. As for the flame retardant, the oxygen index was 42 as measured by ASTM D 2863. The above test results are shown in Table 1.

EXAMPLES 2~4

A polyimide foam was prepared according to Example 1 except for the use of 3,3',4,4'-benzophenonetetracarboxylic acid dianhydride, methyl alcohol, amine, catalyst, and surfactant in the amounts as shown in Table 1. The physical property thereof was subsequently measured and is shown in Table 1.

EXAMPLES 5~8

A polyimide foam was prepared according to Example 1 except for the use of 3,3',4,4'-benzophenonetetracarboxylic acid dianhydride, methyl alcohol, amine, 2-methylimidazole (2-MID) as catalyst, and surfactant in the amounts as shown in Table 1. The physical property thereof was subsequently measured and is shown in Table 1.

EXAMPLES 9~14

A polyimide foam was prepared according to Example 1 except for the use of 3,3',4,4'-benzophenonetetracarboxylic acid dianhydride, methyl alcohol, catalyst, surfactant in the amounts as shown in Table 1, and a mixture of methylenedianiline and isophoronediamine. The physical property thereof was subsequently measured and is shown in Table 1.

EXAMPLES 15~16

A polyimide foam was prepared according to Example 1 except for the use of 3,3'-4,4'-benzophenonetetracarboxylic acid dianhydride, methyl alcohol, amine, surfactant, and catalyst in the amounts as shown in Table 1. The physical property thereof was subsequently measured and is shown in Table 1.

EXAMPLES 17

A polyimide foam was prepared according to Example 1 except for the use of 3,3',4,4'-benzophenonetetracarboxylic acid dianhydride, amine, surfactant, catalyst, and methyl alcohol in the amounts as shown in Table 1. The physical property thereof was subsequently measured and is shown in Table 1.

Comparative Example 1

A polyimide foam was prepared according to Example 1 except for the use of 3,3',4,4'-benzophenonetetracarboxylic acid dianhydride, methyl alcohol, amine, and surfactant in the amounts as shown in Table 1 with no catalyst. The physical property thereof was subsequently measured and is shown in Table 1.

Comparative Example 2

A polyimide foam was prepared according to Example 1 except for the use of 3,3',4,4'-benzophenonetetracarboxylic acid dianhydride, amine, catalyst, surfactant, and methyl alcohol in the amounts as shown in Table 1 and no catalyst. The physical property thereof was subsequently measured and is shown in Table 1.

Comparative Example 3

A polyimide foam was prepared according to Example 1 except for the use of 3,3',4,4'-benzophenonetetracarboxylic acid dianhydride, methyl alcohol, catalyst, surfactant in the amounts as shown in Table 1 and no catalyst, and a mixture of methylenedianiline and isophoronediamine at a mole ratio of 4 to 6. The physical property thereof was subsequently measured and is shown in Table 1.

TABLE 1

| | Physical Properties of Polyimide Resins | | | | | | | | | |
|---|---|---|---|---|---|---|---|---|---|---|
| | Reactant Compositions (mole) | | | | | | | | Compression | |
| Examples | BTDA | Methyl alcohol | MDA | IPDA | Catalyst | surfactant | Viscosity (dL/g) | Density (kg/m$^3$) | Set (loss %) | Oxygen Index |
| | | | | | IQ | | | | | |
| Example 1 | 1 | 8 | 1 | 0 | 0.01 | 0.01 | 0.030 | 11.1 | 21 | 42 |
| Example 2 | 1 | 8 | 1 | 0 | 0.025 | 0.01 | 0.035 | 8.5 | 18 | 43 |
| Example 3 | 1 | 8 | 1 | 0 | 0.05 | 0.01 | 0.042 | 14.4 | 20 | 42 |

-continued

Physical Properties of Polyimide Resins

| Examples | Reactant Compositions (mole) | | | | | | Viscosity (dL/g) | Density (kg/m³) | Compression Set (loss %) | Oxygen Index |
|---|---|---|---|---|---|---|---|---|---|---|
| | BTDA | Methyl alcohol | MDA | IPDA | Catalyst | surfactant | | | | |
| Example 4 | 1 | 8 | 1 | 0 | 0.10 2-MID | 0.01 | 0.061 | 15.0 | 25 | 42 |
| Example 5 | 1 | 8 | 1 | 0 | 0.01 | 0.01 | 0.031 | 9.6 | 18 | 43 |
| Example 6 | 1 | 8 | 1 | 0 | 0.025 | 0.01 | 0.037 | 8.2 | 15 | 43 |
| Example 7 | 1 | 8 | 1 | 0 | 0.05 | 0.01 | 0.043 | 10.9 | 19 | 42 |
| Example 8 | 1 | 8 | 1 | 0 | 0.10 IQ | 0.01 | 0.053 | 17.0 | 23 | 41 |
| Example 9 | 1 | 8 | 0.9 | 0.1 | 0.025 | 0.01 | 0.040 | 14.7 | 20 | 41 |
| Example 10 | 1 | 8 | 0.8 | 0.2 | 0.025 | 0.01 | 0.041 | 11.0 | 22 | 38 |
| Example 11 | 1 | 8 | 0.75 | 0.25 | 0.025 2-MID | 0.01 | 0.038 | 11.3 | 25 | 37 |
| Example 12 | 1 | 8 | 0.9 | 0.1 | 0.025 | 0.01 | 0.035 | 10.5 | 20 | 41 |
| Example 13 | 1 | 8 | 0.8 | 0.2 | 0.025 | 0.01 | 0.037 | 12.7 | 22 | 38 |
| Example 14 | 1 | 8 | 0.75 | 0.25 | 0.025 IQ | 0.01 | 0.042 | 10.7 | 23 | 37 |
| Example 15 | 1 | 8 | 1 | 0 | 0.025 | 0.05 | 0.035 | 8.7 | 20 | 42 |
| Example 16 | 1 | 8 | 1 | 0 | 0.025 | 1.0 | 0.041 | 9.4 | 20 | 43 |
| Example 17 | 1 | 15 | 1 | 0 | 0.025 IQ | 0.01 | 0.034 | 12.5 | 30 | 43 |
| Comp. Exp 1 | 1 | 8 | 1 | 0 | 0 | 0.01 | 0.035 | 10.5 | (a) | 40 |
| Comp. Exp 2 | 1 | 1 | 1 | 0 | 0.025 | 0.01 | 0.020 | 15.5 | 40 | 42 |
| Comp. Exp 3 | 1 | 8 | 0.4 | 0.6 | 0.025 | 0.01 | 0.025 | 18.5 | 45 | 32 |

(a): Impossible to measure
BTDA: 3,3',4,4'-benzophenonetetracarboxylic acid anhydride
MDA: Methylenedianiline, IPDA: isophoronediamine
IQ: Isoquinoline, 2-MID: 2-methylimidazole As summarized from the aforementioned examples, the polyimide foam according to the present invention, by means of using a catalyst, was found to have homogeneous cell size and distribution, low density, and superior restoring capacity and flame retardancy. Consequently, the present invention has the effect of providing a preparing process for a polyimide foam with superior heat-resistance and heat-insulating property, which can be widely used as substrate in aerospace, submarine, special ship, and high-speed train.

What is claimed is:

1. A method of preparing a polyimide foam comprising the steps of:
   a) adding to an aromatic ester solution, a carboxylic acid, an anhydride thereof or a mixture thereof, a divalent amine or a mixture of divalent amines in an amount equivalent to said carboxylic acid, a catalyst, and a surfactant to form a polyimide precursor, wherein said aromatic ester solution is produced by reacting an aromatic carboxylic acid or an anhydride thereof with an excess of an aliphatic univalent alcohol;
   b) preheating and then heating said polyimide precursor by means of a microwave oven to form a partially imidized and foamed polyimide precursor;
   c) curing said partially imidized and foamed polyimide precursor at a high temperature to form said polyimide foam;
   wherein said catalyst is isoquinoline, quinoline, imidazole, 1-methylimidazole, 2-methylimidazole, 4-methylimidazole, pyrrole, pyrazole, indole, pyridazine or pyrimidine.

2. A method of preparing a polyimide foam according to claim 1, wherein said aromatic carboxylic acid is 3,3',4,4'-benzophenonetetracarboxylic acid, and the anhydride thereof is 3,3',4,4'-benzophenonetetracarboxylic acid dianhydride.

3. A method of preparing a polyimide foam according to claim 1, wherein said divalent amine is a mixture of aromatic amines comprising aromatic amines or 50 mol % or less of alicyclic divalent amines.

4. A preparation method of a polyimide foam according to claim 3, wherein said aromatic divalent amine is selected from the group consisting of 3,3'-diamino-diphenylsulfone, 4,4'-diamino-diphenylsulfone, 3,3'-diamino-diphenylsulfide, 4,4'-diamino-diphenylsulfide, 3,3'-diamino-diphenylether, 4,4'-diamino-diphenylether, meta-phenylenediamine, p-phenylenediamine, and p,p'-methylenedianiline; and said alicyclic divalent amine is isophoronediamine or bis-amino-methylcyclohexane.

5. A method of preparing a polyimide foam according to claim 1, wherein said aliphatic alcohol is an aliphatic univalent alcohol with 1 to 6 carbons.

6. A method of preparing a polyimide foam according to claim 1, wherein the mole ratio between the aromatic carboxylic acid or the anhydride thereof to the aliphatic alcohol is 3 to 20.

7. A method of preparing a polyimide foam according to claim 1, wherein said catalyst is used in the amount of 0.01 to 10 mol % to aromatic carboxylic acid or the anhydride thereof.

8. A method of preparing a polyimide foam according to claim 1, wherein said polyimide precursor has the intrinsic viscosity of 0.01 to 0.2 dL/g.

9. A method of preparing a polyimide foam according to claim 1, wherein said polyimide precursor has the average particle size of 300 μm or less.

10. A method of preparing a polyimide foam according to claim 1, wherein the degree of imidization of the foam is in the range of 10 of 50%.

11. A method of preparing a polyimide foam according to claim 1, wherein the curing temperature is in the range of 200 to 300° C., and curing time is 0.5 to 4 hours.

12. A method of preparing a polyimide foam according to claim 1, wherein the density of the foam is in the range of 3 to 30 kg/m$^3$.

13. A method of preparing a polyimide foam according to claim 1, wherein the average size of the cell is 50 μm to 2 mm.

14. A method of preparing a polyimide foam according to claim 1, wherein said foam comprises 70% or more of the open cell structure.

\* \* \* \* \*